United States Patent
Eriksen et al.

(10) Patent No.: US 9,303,694 B2
(45) Date of Patent: Apr. 5, 2016

(54) BEARING FOR A WIND TURBINE

(71) Applicant: SIEMENS AKTIENGESELLSCHAFT, München (DE)

(72) Inventors: Uffe Eriksen, Horsens (DK); Claus Michaelsen, Herning (DK); Claus Thygesen, Låsby (DK)

(73) Assignee: SIEMENS AKTIENGESELLSCHAFT (DE)

(*) Notice: Subject to any disclaimer, the term of this patent is extended or adjusted under 35 U.S.C. 154(b) by 0 days.

(21) Appl. No.: 14/280,761

(22) Filed: May 19, 2014

(65) Prior Publication Data

US 2015/0023621 A1    Jan. 22, 2015

(30) Foreign Application Priority Data

Jul. 19, 2013    (EP) .................................. 13177154

(51) Int. Cl.
| | |
|---|---|
| *F16C 37/00* | (2006.01) |
| *F03D 11/00* | (2006.01) |
| *F03D 1/04* | (2006.01) |
| *F16C 33/10* | (2006.01) |

(52) U.S. Cl.
CPC ............ *F16C 37/00* (2013.01); *F03D 11/0008* (2013.01); *F16C 37/007* (2013.01); *F03D 1/04* (2013.01); *F05B 2220/64* (2013.01); *F05B 2260/20* (2013.01); *F05B 2260/64* (2013.01); *F16C 33/1005* (2013.01); *F16C 2300/14* (2013.01); *F16C 2360/31* (2013.01)

(58) Field of Classification Search
CPC ...... F16C 19/525; F16C 37/00; F16C 37/007; F16C 33/6696; F16C 33/6651; F16C 33/6662; F16C 2300/31; F16C 2300/14; F16C 33/1005; F01D 25/125; F03D 9/008; F03D 1/04; F05B 2260/20; Y10S 384/90
USPC ............ 384/317, 320–321, 476, 900; 310/64, 310/90; 415/4.5
See application file for complete search history.

(56) References Cited

U.S. PATENT DOCUMENTS

| | | | | |
|---|---|---|---|---|
| 4,541,738 | A | * | 9/1985 | Leibensperger et al. ...... 384/470 |
| 5,749,660 | A | * | 5/1998 | Dusserre-Telmon et al. . 384/475 |
| 5,915,843 | A | * | 6/1999 | Mattera .......................... 384/476 |
| 6,117,063 | A | * | 9/2000 | Szepessy et al. ................ 494/14 |
| 7,232,258 | B2 | * | 6/2007 | Garcia ........................... 384/476 |

(Continued)

FOREIGN PATENT DOCUMENTS

| | | |
|---|---|---|
| WO | WO 2011082836 A1 | 7/2011 |
| WO | WO 2012052521 A1 | 4/2012 |

OTHER PUBLICATIONS

European Search Report issued Dec. 19, 2013; Application No. 13177154.5; 7 pgs.

*Primary Examiner* — Marcus Charles
(74) *Attorney, Agent, or Firm* — Schmeiser Olsen & Watts LLP

(57) ABSTRACT

A bearing for a wind turbine, the use of the bearing and a method to control the temperature of the bearing is provided. A bearing for a wind turbine comprises an inner ring and an outer ring. The inner ring and the outer ring are prepared and arranged in a way to rotate with respect to each other. The inner ring comprises at least one channel. The channel is prepared and arranged in a way that air flows along inside the channel so that excess heat of the inner ring is removed by the airflow in the channel.

20 Claims, 6 Drawing Sheets

(56) References Cited

U.S. PATENT DOCUMENTS

| | | | |
|---|---|---|---|
| 7,256,512 B1* | 8/2007 | Marquiss | 290/55 |
| 8,167,098 B2* | 5/2012 | Jessberger | 188/264 A |
| 8,371,127 B2* | 2/2013 | Durocher et al. | 60/806 |
| 2007/0114861 A1* | 5/2007 | Bott et al. | 310/71 |
| 2008/0006357 A1* | 1/2008 | Wakabayashi et al. | 152/415 |
| 2008/0303360 A1* | 12/2008 | Vinson et al. | 310/59 |
| 2010/0164232 A1* | 7/2010 | Siegfriedsen | 290/55 |
| 2012/0193845 A1* | 8/2012 | Yamanaka | 267/64.28 |
| 2012/0280511 A1 | 11/2012 | Eriksen | |
| 2012/0282096 A1* | 11/2012 | Eriksen et al. | 384/476 |
| 2013/0287328 A1* | 10/2013 | Frank | 384/476 |

\* cited by examiner

BEARING FOR A WIND TURBINE

CROSS-REFERENCE TO RELATED APPLICATIONS

This application claims priority to EP Application No. 13177154.5, having a filing date of Jul. 19, 2013, the entire contents of which are hereby incorporated by reference.

FIELD OF TECHNOLOGY

The following relates to a bearing for a wind turbine, the use of the bearing and a method to control a temperature of the bearing.

BACKGROUND

A wind turbine comprises a rotor with a hub and rotor blades. During the operation of the wind turbine, the wind interacts with the rotor blades and rotates the rotor. The rotation of the rotor is transferred to an electric generator to generate electric power. In a direct driven wind turbine, the rotor and the generator are directly coupled, without a gearbox between the rotor and the generator. Thus, the rotor of the wind turbine is directly coupled to the rotor of the electric generator.

The rotor of the wind turbine and the rotor of the electric generator belong to the rotational part of the wind turbine. The rotational part of the wind turbine is supported by a bearing. The bearing comprises a stationary ring and a rotatable ring. The stationary ring is attached to the stationary part of the wind turbine, and the rotatable ring is connected to the rotatable part of the wind turbine. The bearing is often called the main bearing of the wind turbine. The main bearing is a rolling element bearing or a sliding bearing.

The lifetime of the bearing, and the width of the air gap in the generator, depend on the clearance in the bearing. Thus it is important to control the clearance in the bearing.

During the start-up of the wind turbine and during operation, the bearing warms up due to friction in the bearing. Due to the warming, the parts of the bearing expand. This expansion influences the clearing of the bearing. The clearance stays mainly the same, as long as the stationary ring and the rotatable ring of the bearing expand mainly equally. This is the case when they show mainly the same temperature.

During the start-up of the wind turbine or changes in the load in the rotating part of the wind turbine, the temperature in the bearing changes. Due to the different mass of the rotatable ring and the stationary ring of the bearing, the rings might warm up or cool down in a different time. This leads to a difference in the temperature of the bearing rings. Thus, the clearance of the bearing is changing. A changing clearance has a negative effect on the lifetime of the bearing and/or the width of the air gap of the generator.

It is therefore known to cool the bearing with an integrated oil lubrication system, where the oil is cooled and is pumped through the bearing. This shows the problem that the exchange rate of the oil in the bearing is too low to cool the whole bearing with the lubrication oil. WO 2011082836 A1 describes a cooling system of a bearing of a direct driven wind turbine, whereby the cooling system comprises at least one heat sink being in thermal contact to the inner ring of the bearing and a heat dissipater being in thermal communication with the heat sink. The system shows the disadvantage that a cooling liquid is circulating though the heat sink at the bearing and the heat dissipater. Thus, the installation of ducts for the cooling fluid is necessary that guide the cooling liquid, and there is a certain risk that the liquid might leak from the system.

Accordingly, a need exists for an improved arrangement to cool the bearing.

SUMMARY

A bearing for a wind turbine comprises an inner ring and an outer ring. The inner ring and the outer ring are prepared and arranged in a way to rotate with respect to each other. The inner ring comprises at least one channel. The channel is prepared and arranged in a way that air flows along inside the channel so that excess heat of the inner ring is removed by the airflow in the channel.

The bearing comprises an inner ring and an outer ring. The bearing can be either a rolling element bearing or a sliding bearing.

When the bearing is used in a wind turbine, one of the bearing rings is connected to the stationary part of the wind turbine and the other bearing ring is connected to the rotating part of the wind turbine. The stationary part of the wind turbine comprises the stator of the electrical generator and the rotatable part of the wind turbine comprises the rotor of the electrical generator and the hub of the wind turbine.

The inner ring of the bearing can either be connected to the stationary part of the wind turbine or to the rotatable part of the wind turbine. The inner ring comprises a channel, whereby the channel is in thermal communication with the inner ring. Thus, heat of the inner ring is transferred to the channel. Air flows along inside the channel so that excess heat of the inner ring is removed by the airflow in the channel.

During the operation of the bearing, excess heat is generated due to friction in the bearing. The excess heat is transferred from the inner ring of the bearing to the channel and is removed by the airflow in the channel. Thus, the air flowing through the channel cools the channel and the inner ring of the bearing, and excess heat is removed from the inner ring of the bearing. Thus, the inner ring of the bearing is cooled and the temperature of the inner ring of the bearing can be influenced. Likewise, the thermal expansion of the inner ring of the bearing can be influenced, and the clearance of the bearing can be influenced and controlled by cooling the inner ring of the bearing.

Embodiments of the bearing used in a wind turbine, especially in a direct driven wind turbine, the air gap of the electrical generator depends on the clearance of the main bearing. By controlling the clearance of the main bearing, the width of the air gap can be controlled. The clearance of the bearing is important for the lifetime of the bearing. To achieve a long lifetime of the bearing, the clearance of the bearing may be kept within a certain range.

The clearance of the bearing can be influenced by cooling the bearing. By influencing the temperature of the inner ring of the bearing, the clearance of the bearing can be kept within a certain range. Thus, the lifetime of the bearing can be enlarged by controlling the temperature of the inner ring of the bearing. Thus, the lifetime of the bearing can be increased, the necessity to exchange the bearing can be reduced, and the costs for exchanging the bearing can be saved.

The channel may be at least partially covered by a lid. Embodiments of the channel can be a closed channel. Thus, the air flow is guided along inside the channel. The air inside a covered channel may not mix with the air outside of the covered channel. The air is forced to flow along inside the channel. Thus, the cooling effect can be improved.

Embodiments of the channel may comprise at least two openings that are used as an air inlet opening and as an air outlet opening to allow the air to flow through the channel. The channel may comprise one opening that allows the air to flow into the channel and one opening that allows the air to flow out of the channel. Thus, the air can flow along inside the channel.

Embodiments of the opening may be an open end of the channel, a hole in the wall of the channel, or a slot in the wall of the channel. Thus, the air can enter the channel at one open end of the channel, flow along inside the channel, and leave the channel at another open end. Embodiments of the channel can comprise a hole in the wall of the channel so that the air can enter the channel through the hole, flow along inside the channel, and leave the channel at an open end. Embodiments of the opening in the channel can also be a slot in the wall of the channel to achieve a larger area for the air to enter the channel.

A ventilator can be arranged at least at one opening of the channel in a way that a ventilator moves air through the opening of the channel and through the channel. Thus, the air is forced through the channel by the ventilator. The amount of air moving through the channel can be influenced by the ventilator, and the amount of cooling of the inner ring can be influenced by controlling the ventilator at the channel.

Embodiments of the inner ring may comprise a plurality of channels. Thus, the air flows through a plurality of channels. The channels can be arranged in parallel to each other. Thus, the air is guided through parallel channels along the inner ring. The individual channels can be designed with a different diameter; the amount of air flowing through the channels can vary from one channel to the next. Thus, the local efficiency of the cooling can be influenced by the design of the channels.

Embodiments of the single channels may be equipped with individual ventilators to control the amount of air moving through the channel. Thus, the amount of cooling effected by the individual channel can be influenced. The ventilator may be arranged at a plurality of channels in a way that the ventilator overlaps the channels at the openings of the channels so that the ventilator moves air through the channels.

Embodiments of the inner ring may comprise a plurality of channels. Embodiments of the channels may comprise an opening to allow the air to enter or exit the channel. A ventilator may be arranged at the channels overlapping the channels at their openings so that the ventilator can move the air through the openings of the channels and through the channels. Thus, one ventilator may be needed for a plurality of channels.

Embodiments of the inner ring may comprise a radially inner surface and at least one channel arranged at the radially inner surface of the inner ring of the bearing. Embodiments of the bearing may comprise an inner ring and an outer ring. The inner ring may be arranged radially inwardly of the outer ring. The inner ring may comprise a radially inner surface. At least one channel of the inner ring can be arranged at a radially inner surface of the inner ring. Thus, the inner ring is cooled from the side of the radially inner surface.

Embodiments of the channel may be formed by an extruded aluminum profile that is at least partially covered by a lid, and it may be arranged at the surface of the inner ring. An extruded aluminum profile may form one or more open tranches or channels. The extruded aluminum profile can be closed by a lid that is connected to the extruded aluminum profile. Thus, the open channels or tranches of the extruded aluminum profile may be closed to form a channel to allow the air to flow along inside the channel. The extruded aluminum profile that is covered by a lid may be arranged along the surface of the inner ring. The air moves to the covered tranches or channels in the extruded aluminum profile and cools the aluminum profile.

The aluminum profile is in thermal communication with the inner ring. Thus, the inner ring of the bearing is cooled by the air moving through the extruded aluminum profile. The ventilator may be arranged at an air inlet opening at the channel so that the ventilator blows the air through the channel. The opening of the channel used as an air inlet opening can be an open end of the channel, a hole in the wall of the channel, or a slot in the wall of the channel. The ventilator may be arranged at the air inlet opening and forces the air through the air inlet opening into the channel. The air may flow along inside the channel and exit the channel at a second opening. Thus, the air is forced through the channels by the ventilator. The air flows along inside the channels and cools the inner ring of the bearing.

The ventilator may be arranged at an air outlet opening at the channel so that the ventilator sucks the air through the channel. The opening used as an air outlet opening of the channel can be an open end of the channel, a hole in the wall of the channel, or a slot in the wall of the channel. The ventilator may be arranged at the air outlet opening in a way that it sucks the air through the opening out of the channel. The air may enter the channel through an air inlet opening. It flows along inside the channel and can be forced by the ventilator to exit the channel at the air outlet opening.

The air flows along inside the channel and cools the channel and thus cools the inner ring of the bearing. Embodiments of the channels of the plurality of channels may have at least two different lengths, so the different local amounts of excess heat are removed from the inner ring by the air flowing along inside the channels.

A plurality of channels may be arranged along the surface of the inner ring. Several channels of the plurality of channels can be of a different length. Thus, the cooling effect of the channels is different.

The amount of excess heat present in the inner ring of the bearing can vary. Channels of different length can be used to remove different amounts of excess heat present in the inner ring. Thus, the length of the channels can be designed in a way to remove different amounts of energy. Thus, the cooling of the inner ring of the bearing is optimized, and temperature differences in the inner ring can be leveled out.

Embodiments of the bearing may comprise at least one temperature measurement device and a control device for controlling the air flow in the channel of the bearing. The temperature of the inner ring can be measured with a temperature measurement device. The temperature measurement device can be arranged at the outer ring or at the inner ring of the bearing. A control device can control the amount of air flow through the channels. Thus, the amount of cooling of the bearing can be controlled, and the overall temperature of the bearing can be controlled.

In an exemplary embodiment, a bearing is used as a main bearing in a direct driven wind turbine. In the direct driven wind turbine, the rotatable part of the wind turbine is connected to the stationary part of the wind turbine by a bearing. The rotatable part of the wind turbine comprises the rotor of the wind turbine and the rotor of the electrical generator. The stationary part of the wind turbine comprises the stator of the electrical generator. A bearing is used to connect the rotatable part and the stationary part of the wind turbine. The bearing can be a rolling element bearing or a sliding bearing. The main bearing of the wind turbine is used to transfer radial forces, axial forces and tilting moments from the rotor of the wind turbine to the stationary part of the wind turbine. In addition, a second bearing can be used.

The main bearing of a wind turbine experiences high forces when the wind turbine is in operation. Thus, the main bearing of a wind turbine experiences a high friction and thus a high amount of excess heat is generated in the main bearing of a wind turbine. Thus, the main bearing of the wind turbine needs to be cooled to keep the temperature of the bearing stable. By cooling the main bearing of a wind turbine, the thermal expansion of the bearing rings and thus the clearance of the main bearing can be influenced. In a direct driven wind turbine, the air gap of the electrical generator depends on the clearance of the bearing. By controlling the temperature of the bearing, the clearance of the bearing and thus the air gap of the electrical generator can be kept within a certain range.

The arrangement according to exemplary embodiments as described herein can provide an easy and simple way to cool the inner ring of the bearing. Air can be used as a cooling medium, thus leakage in the cooling system does not affect electrical equipment or mechanical equipment as it would when water or oil is used as a cooling liquid. In addition, the cooling circuit can be built as an open cooling circuit as air is available everywhere in the nacelle of a wind turbine.

Embodiments of a method for controlling the temperature of a bearing may comprise the step of guiding an airflow through at least one channel of the inner ring of the bearing.

BRIEF DESCRIPTION

Some of the embodiments will be described in detail, with reference to the following figures, wherein like designations denote like members, wherein.

DETAILED DESCRIPTION

Figure 1:
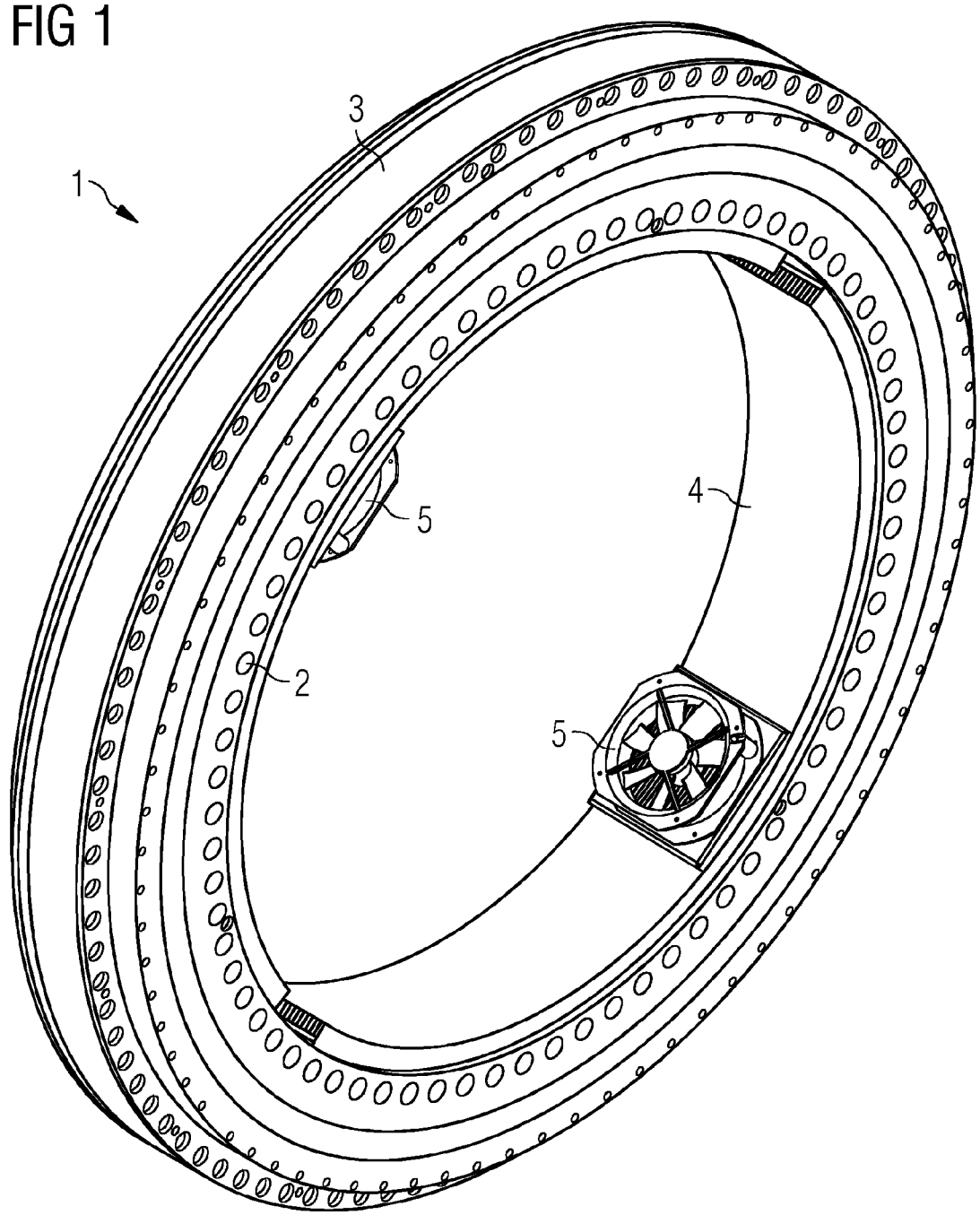
FIG. 1 shows an embodiment of a bearing for a wind turbine.

FIG. 1 shows an embodiment of a bearing for a wind turbine. The bearing 1 comprises an inner ring 2 and an outer ring 3. The inner ring 2 and the outer ring 3 are prepared and arranged in a way to rotate with respect to each other. The bearing 1 can be a rolling element bearing or a sliding bearing.

Channels 4 are arranged at a radially inner surface of the inner ring 2 of the bearing 1. The channels 4 are in thermal communication with the inner ring 2 of the bearing 1.

A ventilator 5 is arranged at openings or holes in the channels 4 to move air through the channels 4, to cool the inner ring 2 of the bearing 1. The ventilator 5 forces air through the channels 4 that are attached to the inner ring 2. The air moves through the channels 4 and removes the excess heat from the inner ring 2 and cools the inner ring 2 of the bearing 1. The air exits the channels 4 at the open end of the channels 4.

Figure 2:
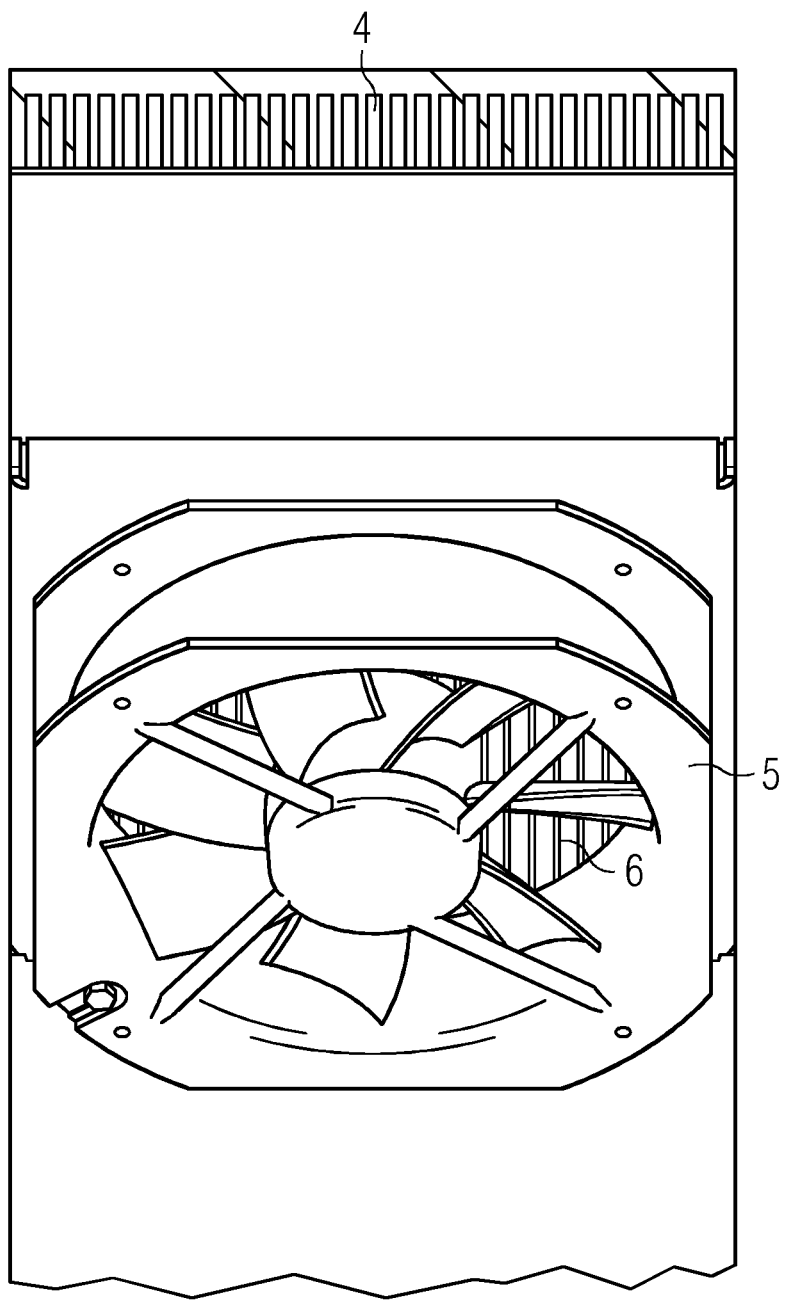
FIG. 2 shows a detail of an embodiments of the channels.

FIG. 2 shows a detail of an embodiment of the channels. For instance, FIG. 2 shows a part of the channels 4. Channels 4 are arranged along the inner ring of the bearing. The channels 4 comprise openings 6. A ventilator 5 is arranged on top of the openings 6 to force air through the openings 6 into the channels 4. The air enters the channels 4 through the openings 6, and it flows along inside the channels 4 and exits the channels 4 at their open ends.

The air moving through the channels 4 picks up the excess heat of the inner ring 2 of the bearing 1 that is generated during the operation of the bearing 1.

The channels in FIG. 2 are formed by an extruded aluminum profile. The profile comprises a plurality of tranches that are covered by a common lid. Thus, channels 4 are formed that can be used to force air through them. The openings in the channels 4, to allow the air to enter the channels 4, are formed by an area without a lid on top of the extruded aluminum profile.

Figure 3:
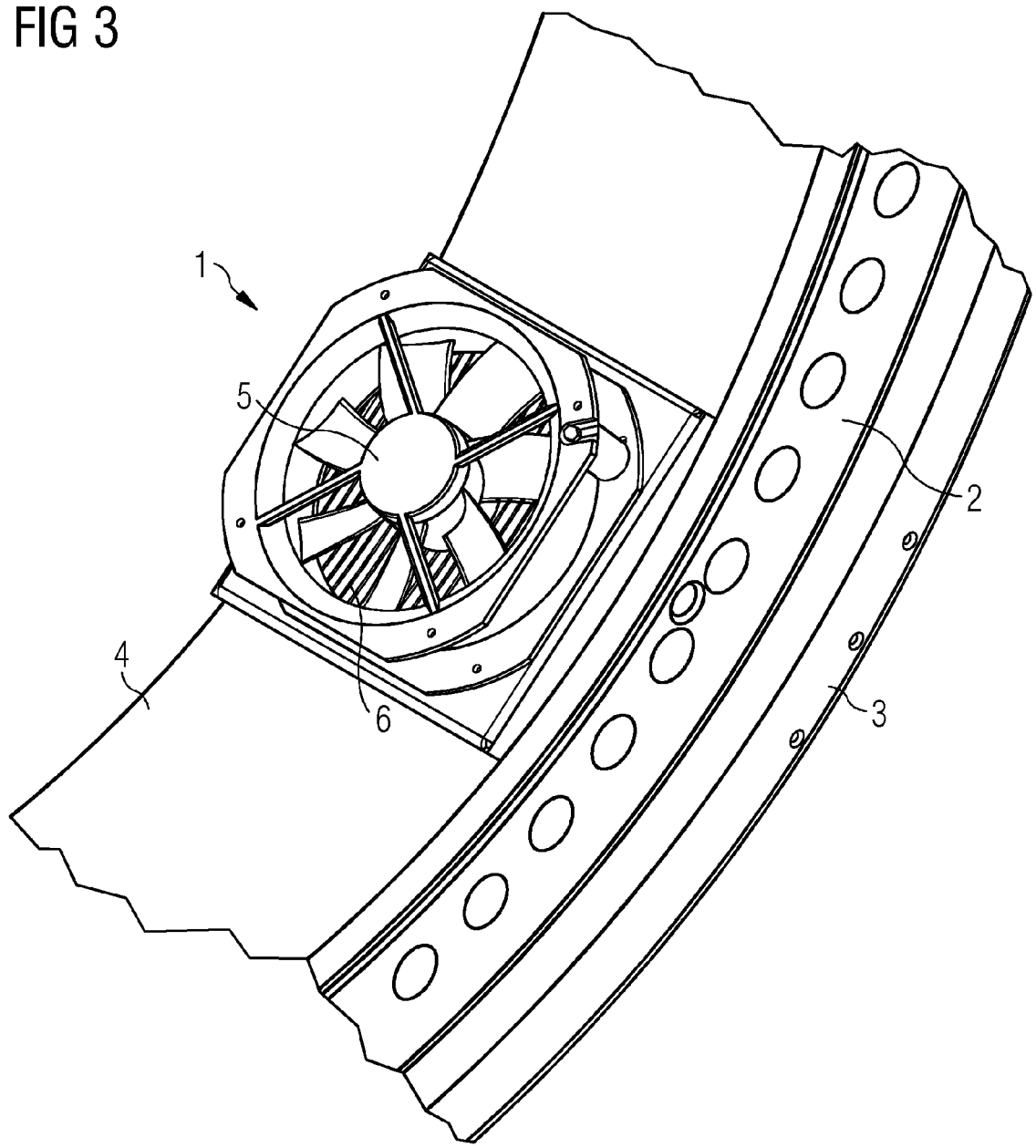
FIG. 3 shows another detail of an embodiment of the bearing.

FIG. 3 shows another detail of an embodiment of the bearing 1. The bearing 1 shows an inner ring 2 and on outer ring 3. The inner ring 2 and the outer ring 3 are arranged in a way that they can rotate in respect to each other.

Channels 4 are connected to the inner ring 2 of the bearing 1. The channels 4 comprise openings or holes 6. A ventilator 5 is arranged at the holes 6 to suck air out of the channels 4 through the openings or holes 6. The air moves along inside the channels 4 and picks up the excess heat that is generated in the bearing 1 during the operation.

The channels 4 are formed by an extruded aluminum profile that is at least partially covered by a lid. The opening 6 is formed by an area where no lid is present on top of the extruded aluminum profile.

Figure 4:
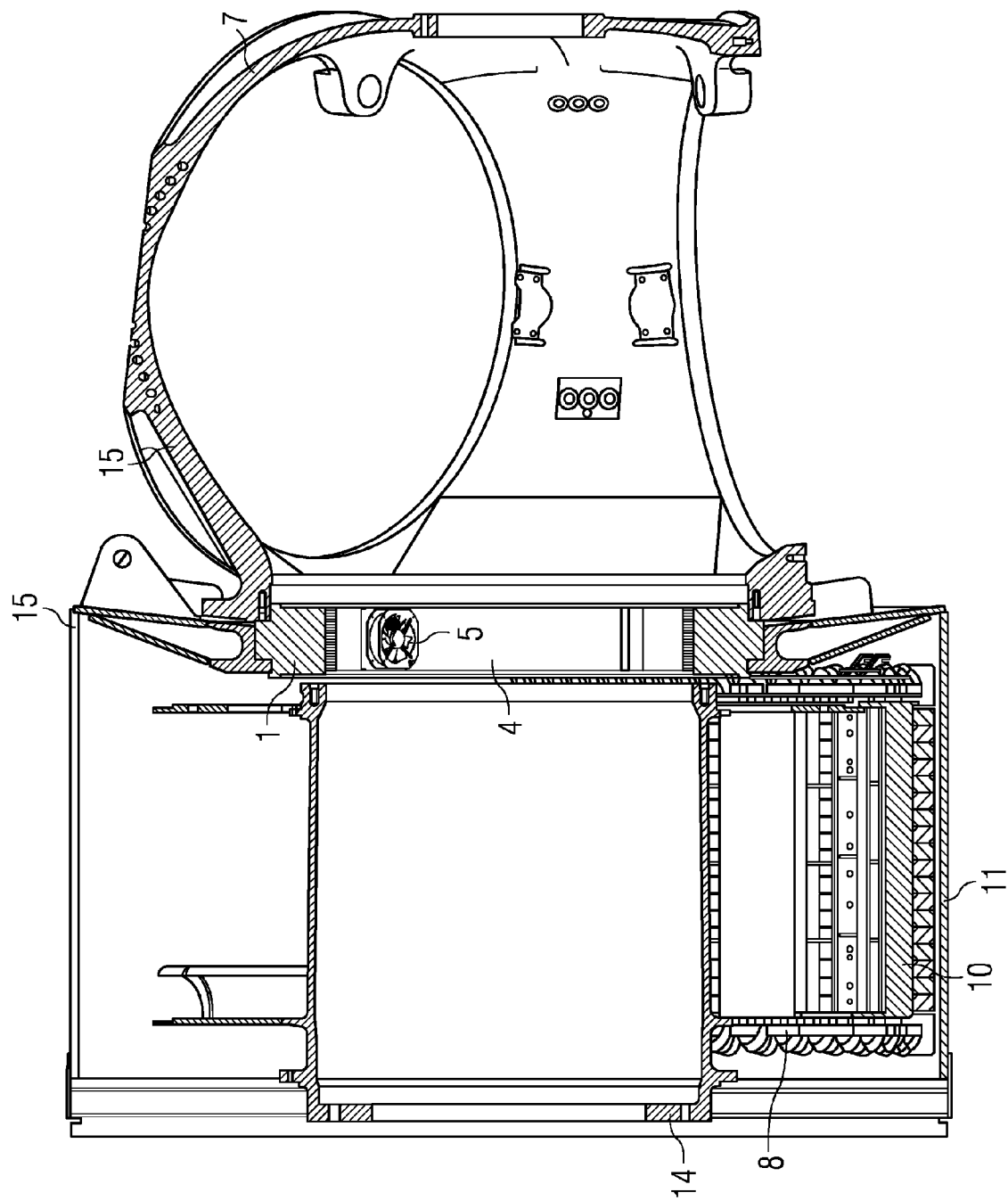
FIG. 4 shows an embodiment of a bearing in a direct driven wind turbine.

FIG. 4 shows an embodiment of a bearing 1 in a direct driven wind turbine. The bearing 1 comprises an inner ring 2 and an outer ring 3. The inner ring 2 is connected to the stationary part 14 of the wind turbine. The outer ring is connected to the rotatable part 15 of the wind turbine. The stationary part 14 of the wind turbine comprises the stator 10 of the electrical generator 8. The rotatable part 15 of the wind turbine comprises the rotor 11 of the electrical generator 8 and the hub 7 of the wind turbine.

Channels 4 are arranged along the inner circumferential surface of the inner ring 2 of the bearing 1. A ventilator 5 is arranged at the channels 4 to force air through holes 6 in the channels 4. The air moves along inside the channels 4 to cool the inner ring of the bearing 1.

Figure 5:
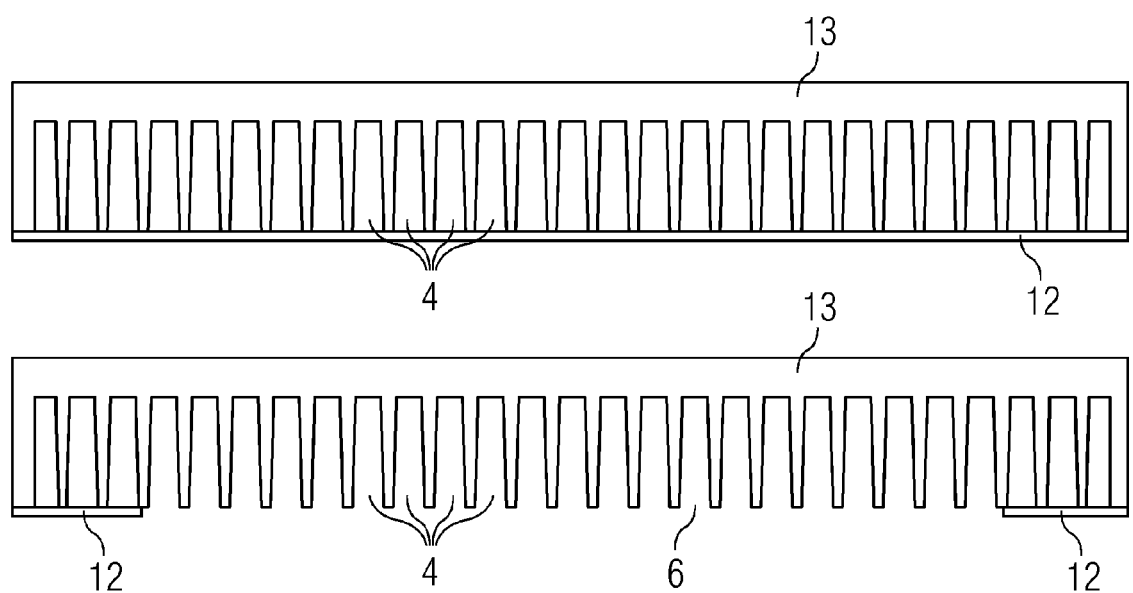
FIG. 5 shows a detail of an embodiment of the channels.

FIG. 5 shows a detail of the channels 4. For example, FIG. 5 shows a cut through the channels 4. The channels 4 are made of an extruded aluminum profile 13. The profile 13 is covered by a lid 12. The channels 4 comprise an opening 6 to allow air to enter or exit the channels 4. The opening or hole 6 is achieved by a gap in the lid 12. A ventilator is later arranged to the opening 6, the gap in the lid 12, to force air into the channels 4, or to suck air out of the channels 4. The channels 4 can also be casted together with the inner ring 2 to form an integral part of the inner ring 2 of the bearing 1.

Figure 6:
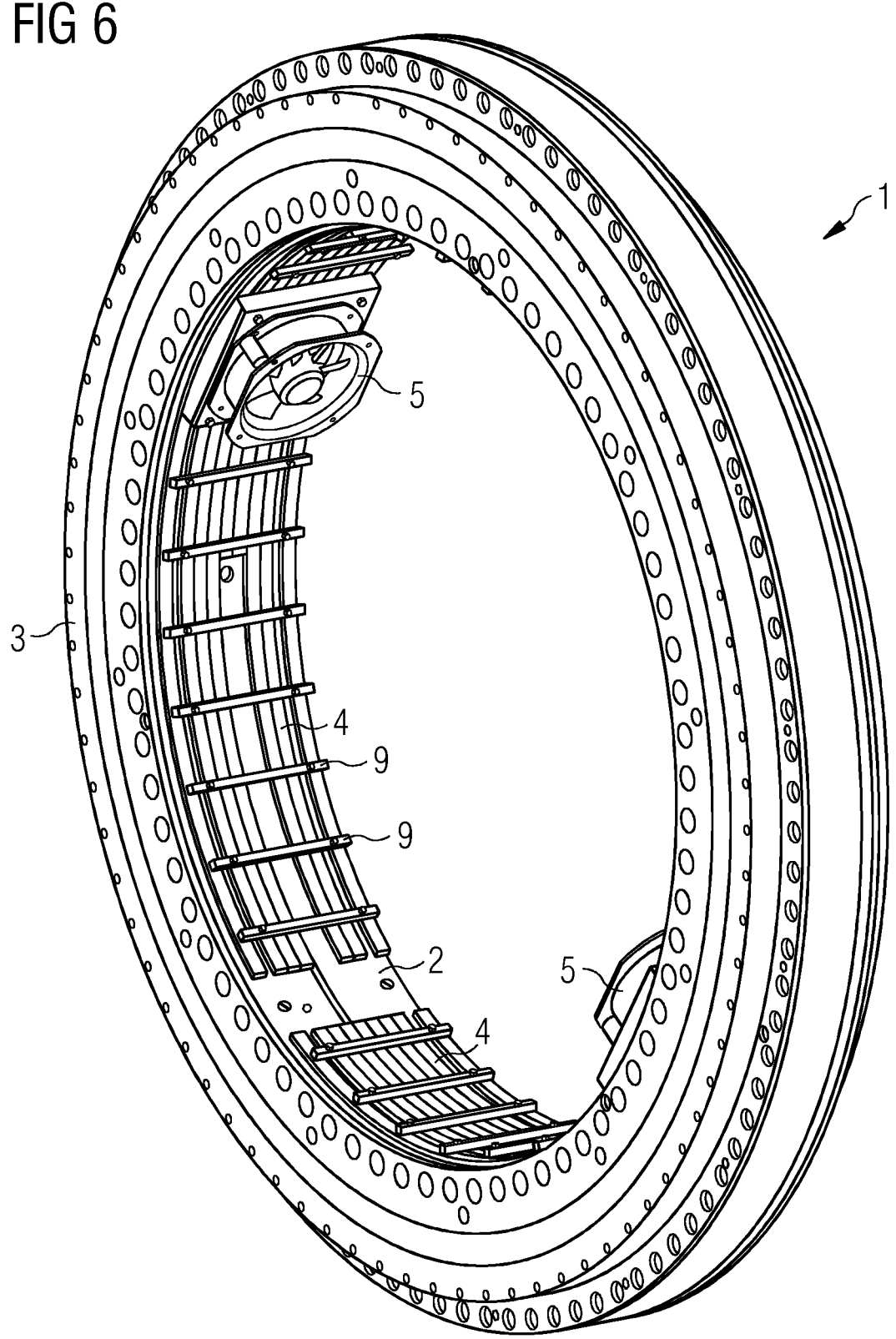
FIG. 6 shows another embodiment of the bearing.

FIG. 6 shows another embodiment of the bearing 1 for a wind turbine. The bearing 1 comprises an inner ring 2 and an outer ring 3. The inner ring 2 and the outer ring 3 are prepared and arranged in a way to rotate with respect to each other. The bearing 1 can be a rolling element bearing or a sliding bearing.

Channels 4 are arranged at a radially inner surface of the inner ring 2 of the bearing 1. The channels 4 are in thermal communication with the inner ring 2 of the bearing 1. The channels 4 show a different length along the inner ring 2, that depends of the amount of heat that needs to be removed from the inner ring 2. The channels 4 are attached to the inner ring 2 of the bearing 1 by bars 9 that are screwed to the inner ring 2.

A ventilator 5 is arranged at openings or holes in the channels 4 to move air through the channels 4, to cool the inner ring 2 of the bearing 1. The ventilator 5 forces air through the channels 4 that are attached to the inner ring 2. The air moves through the channels 4 and removes the excess heat from the inner ring 2 and cools the inner ring 2 of the bearing 1. The air exits the channels 4 at the open end of the channels 4.

The illustration in the drawings is in schematic form. It is noted that in different figures, similar or identical elements are provided with the same reference signs.

Although the present invention has been described in detail with reference to the exemplary embodiments, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A bearing for a wind turbine comprising:
    an inner ring and an outer ring, the inner ring and the outer ring prepared and arranged in a way to rotate with respect to each other; and
    an extruded profile component that forms at least one channel, the extruded profile component attached to the inner ring, the at least one channel prepared and arranged in a way that air flows along inside the at least one channel, so that excess heat of the inner ring is removed by the air flow in the at least one channel.

2. The bearing for a wind turbine according to claim 1, wherein the at least one channel is at least partially covered by a lid.

3. The bearing for a wind turbine according to claim 1, wherein the at least one channel comprises at least two openings that are used as an air inlet opening and as an air outlet opening, to allow the air to flow through the at least one channel.

4. The bearing for a wind turbine according to claim 1, wherein an opening of the at least one channel is at least one of an open end of the at least one channel, a hole in a wall of the at least one channel, and a slot in the wall of the at least one channel.

5. The bearing for a wind turbine according to claim 1, wherein a ventilator is arranged at least at one opening of the at least one channel, in a way that the ventilator moves air through the opening of the at least one channel and through the at least one channel.

6. The bearing for a wind turbine according to claim 5, wherein the ventilator is arranged at the at least one channel in a way that the ventilator overlaps the at least one channel at the opening of the at least one channel, so that the ventilator moves air through the at least one channel.

7. The bearing for a wind turbine according to claim 5, wherein the ventilator is arranged at the opening at the at least one channel so that the ventilator blows the air through the at least one channel, the opening being an air inlet opening.

8. The bearing for a wind turbine according to claim 5, wherein the ventilator is arranged at the opening at the at least one channel so that the ventilator sucks the air through the at least one channel, the opening being an air outlet opening.

9. The bearing for a wind turbine according to claim 1, wherein the inner ring comprises a plurality of channels.

10. The bearing for a wind turbine according to claim 9, wherein the channels of the plurality of channels have at least two different lengths, so that different local amounts of excess heat are removed from the inner ring by the air flowing along inside the plurality of channels.

11. The bearing for a wind turbine according to claim 1, wherein the inner ring comprises a radially inner surface and that the at least one channel is arranged at the radially inner surface of the inner ring of the bearing.

12. The bearing for a wind turbine according to claim 1, wherein the at least one channel is formed by an extruded aluminum profile that is at least partially covered by a lid and that is arranged at a surface of the inner ring.

13. The bearing for a wind turbine according to claim 1, wherein the bearing comprises at least one temperature measurement device and a control device for controlling the air flow in the at least one channel of the bearing.

14. A method comprising:
    utilizing a bearing according to claim 1 as a main bearing in a direct driven wind turbine.

15. A method for controlling a temperature of a bearing of claim 1, comprising the step of:
    guiding an airflow through the least one channel of the inner ring of the bearing.

16. A bearing for a wind turbine comprising:
    an inner ring and an outer ring, the inner ring and the outer ring prepared and arranged in a way to rotate with respect to each other;
    wherein the inner ring comprises at least one channel, the at least one channel prepared and arranged in a way that air flows along inside the at least one channel so that excess heat of the inner ring is removed by the air flow in the at least one channel;
    wherein the at least one channel is formed by an extruded aluminum profile that is at least partially covered by a lid and that is arranged at a surface of the inner ring.

17. The bearing for a wind turbine according to claim 16, wherein the extruded aluminum profile is attached to the surface of the inner ring.

18. A bearing for a wind turbine comprising:
    an inner ring and an outer ring, the inner ring and the outer ring prepared and arranged in a way to rotate with respect to each other;
    wherein the inner ring comprises at least one channel, the at least one channel prepared and arranged in a way that air flows along inside the at least one channel, so that excess heat of the inner ring is removed by the air flow in the at least one channel;
    wherein a ventilator is arranged at least at one opening of the at least one channel, in a way that the ventilator moves air through the opening of the at least one channel and through the at least one channel;
    wherein the ventilator is arranged at the at least one channel in a way that the ventilator overlaps the at least one channel at the opening of the at least one channel, so that the ventilator moves air through the at least one channel.

19. The bearing for a wind turbine according to claim 18, wherein the at least one channel is attached to a surface of the inner ring.

20. The bearing for a wind turbine according to claim 18, wherein the at least one channel is casted together with the inner ring to form an integral part of the inner ring.

* * * * *